US011741190B2

(12) United States Patent
Goyal et al.

(10) Patent No.: US 11,741,190 B2
(45) Date of Patent: *Aug. 29, 2023

(54) MULTI-DIMENSIONAL LANGUAGE STYLE TRANSFER

(71) Applicant: Adobe Inc., San Jose, CA (US)

(72) Inventors: Navita Goyal, Bangalore (IN); Balaji Vasan Srinivasan, Bangalore (IN); Anandha velu Natarajan, Bangalore (IN); Abhilasha Sancheti, College Park, GA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/902,586

(22) Filed: Sep. 2, 2022

(65) Prior Publication Data

US 2022/0414400 A1    Dec. 29, 2022

Related U.S. Application Data

(63) Continuation of application No. 17/073,258, filed on Oct. 16, 2020, now Pat. No. 11,487,971.

(51) Int. Cl.
*G06F 17/00* (2019.01)
*G06F 18/214* (2023.01)
(Continued)

(52) U.S. Cl.
CPC ...... *G06F 18/2148* (2023.01); *G06F 18/2155* (2023.01); *G06F 40/205* (2020.01);
(Continued)

(58) Field of Classification Search
CPC .. G06K 9/6257; G06K 9/0051; G06K 9/6259; G06F 40/205; G06F 40/40;
(Continued)

(56) References Cited

U.S. PATENT DOCUMENTS

2020/0311195 A1\* 10/2020 Mishra .................. G06F 40/253
2020/0356634 A1\* 11/2020 Srinivasan .............. G06F 40/30
(Continued)

OTHER PUBLICATIONS

Gong, Hongyu, et al. "Reinforcement learning based text style transfer without parallel training corpus." arXiv preprint arXiv: 1903.10671 (2019) (Year: 2019).\*
(Continued)

*Primary Examiner* — Andrew T McIntosh
(74) *Attorney, Agent, or Firm* — Kilpatrick Townsend & Stockton LLP (57) ABSTRACT

In some embodiments, a style transfer computing system receives, from a computing device, an input text and a request to transfer the input text to a target style combination including a set of target styles. The system applies a style transfer language model associated with the target style combination to the input text to generate a transferred text in the target style combination. The style transfer language model comprises a cascaded language model configured to generate the transferred text. The cascaded language model is trained using a set of discriminator models corresponding to the set of target styles. The system provides, to the computing device, the transferred text.

20 Claims, 6 Drawing Sheets

(51) Int. Cl.
  *G06F 40/205* (2020.01)
  *G06V 30/414* (2022.01)
  *G06F 40/40* (2020.01)
(52) U.S. Cl.
  CPC ............ *G06F 40/40* (2020.01); *G06V 30/414* (2022.01); *G06F 2218/04* (2023.01)
(58) Field of Classification Search
  CPC ............. G06F 18/2148; G06F 18/2155; G06F 2218/04; G06F 18/214; G06F 18/24133; G06F 40/30; G06F 40/289; G06F 40/253; G06V 30/414; G06V 30/18057
  See application file for complete search history.

(56) References Cited

U.S. PATENT DOCUMENTS

| | | | |
|---|---|---|---|
| 2021/0166125 A1* | 6/2021 | Schäfer | G06N 3/08 |
| 2021/0264109 A1 | 8/2021 | Srinivasan et al. | |
| 2021/0303803 A1* | 9/2021 | Wu | G06N 3/08 |

OTHER PUBLICATIONS

Ma, Yun, et al. "A syntax-aware approach for unsupervised text style transfer." (2019) (Year: 2019).*

U.S. Appl. No. 17/073,258 , "First Action Interview Pilot Program Pre-Interview Communication", dated Apr. 13, 2022, 4 pages.

U.S. Appl. No. 17/073,258 , "Notice of Allowance", dated Jun. 28, 2022, 15 pages.

Brooke et al., "A Multi-Dimensional Bayesian Approach to Lexical Style", Proceedings of NAACL-HLT, Association for Computational Linguistics, Jun. 9-14, 2013, pp. 673-679.

Brooke et al., "Automatic Acquisition of Lexical Formality", Coling '10: Proceedings of the 23rd International Conference on Computational Linguistics: Posters, Aug. 2010, pp. 90-98.

Clinchant et al., "On the Use of BERT for Neural Machine Translation", In Proceedings of the 3rd Workshop on Neural Generation and Translation, Nov. 4, 2019, pp. 108-117.

Conneau et al., "Cross-lingual Language Model Pretraining", Advances in Neural Information Processing Systems, 2019, pp. 7059-7069.

Dai et al., "Style Transformer: Unpaired Text Style Transfer Without Disentangled Latent Representation", In Proceedings of the 57th Annual Meeting of the Association for Computational Linguistics, 2019, pp. 5997-6007.

Danescu-Niculescu-Mizil et al., "A Computational Approach to Politeness With Application to Social Factors", Proceedings of the 51st Annual Meeting of the Association for Computational Linguistics, vol. 1 (Long Papers), Aug. 2013, pp. 250-259.

Devlin et al., "BERT: Pre-Training of Deep Bidirectional Transformers for Language Understanding", In Proceedings of the Conference of the North American Chapter of the Association for Computational Linguistics: Human Language Technologies, vol. 1, May 24, 2019, 16 pages.

Feng et al., "Characterizing Stylistic Elements in Syntactic Structure", Proceedings Joint Conference on Empirical Methods in Natural Language Processing and Computational Natural Language Learning, Association for Computational Linguistics, Jul. 2012, 12 pages.

Fu et al., "Style Transfer in Text: Exploration and Evaluation", arXiv:1711.06861, Available Online at: https://arxiv.org/abs/1711.06861, Nov. 27, 2017, 9 pages.

Ganesan et al., "Opinosis: A Graph-Based Approach to Abstractive Summarization of Highly Redundant Opinions", Proceedings of the 23rd International Conference on Computational Linguistics, Proceedings (Colling 2010), Aug. 2010, pp. 340-348.

Howard et al., "Universal Language Model Fine-Tuning for Text Classification", Proceedings 56th Annual Meeting Association for Computational Linguistics, May 23, 2018, 12 pages.

Hu et al., "Toward Controlled Generation of Text", Proceedings of the 34th International Conference on Machine Learning, vol. 70, 2017, 10 pages.

Jain et al., "Unsupervised Controllable Text Formalization", Association for the Advancement of the Advancement of Artificial Intelligence, Available Online at—https://www.aaai.org/, Feb. 20, 2019, 9 pages.

Jhamtani , "Shakespearizing Modern Language Using Copy-Enriched Sequence-to-Sequence Models", Proceedings of the Workshop on Stylistic Variation, Association for Computational Linguistics, Jul. 20, 2017, 10 pages.

Lahiri , "Complexity of Word Collocation Networks: A Preliminary Structural Analysis", Proceedings of the Student Research Workshop at the 14th Conference of the European Chapter of the Association for Computational Linguistics, Mar. 6, 2014, 10 pages.

Lample et al., "Phrase-Based & Neural Unsupervised Machine Translation", In Proceedings of the 2018 Conference on Empirical Methods in Natural Language Processing, Oct. 31-Nov. 4, 2018, pp. 5039-5049.

Lample et al., "Unsupervised Machine Translation Using Monolingual Corpora Only", Available Online at—arXiv:1711.00043v2, Apr. 13, 2018, 14 pages.

Li et al., "Delete, Retrieve, Generate: A Simple Approach to Sentiment and Style Transfer", Proceedings of the 2018 Conference of the North American Chapter of the Association for Computational Linguistics: Human Language Technologies, vol. 1 (Long Papers), Jun. 2018, pp. 1865-1874.

Liang et al., "Brand Personality of Two Beverages Categories", Available Online at—https://scholar.google.com/scholar?hl=en&as_sdt=0%2C11&q=Brand+Personality+of+Two+Beverages+Categories&btnG=,, Jan. 2011, pp. 196-203.

Lin , "ROUGE: A Package for Automatic Evaluation of Summaries", Text Summarization Branches Out, Association for Computational Linguistics, Jul. 25, 2004, 8 pages.

Liu et al., "Text Summarization with Pretrained Encoders", In Proceedings of the 2019 Conference on Empirical Methods in Natural Language Processing and the 9th International Joint Conference on Natural Language Processing, 2019, pp. 3730-3740.

Maas et al., "Learning Word Vectors for Sentiment Analysis", Proceedings of the 49th Annual Meeting of the Association for Computational Linguistics: Human Language Technologies, Jun. 2011, pp. 142-150.

Madaan et al., "Politeness Transfer: A Tag and Generate Approach", Proceedings of the 58th Annual Meeting of the Association for Computational Linguistics, Jul. 5-10, 2020, pp. 1869-1881.

Mairesse et al., "Controlling User Perceptions of Linguistic Style: Trainable Generation of Personality Traits", Computational Linguistics, vol. 37, No. 3, Sep. 2011, pp. 455-488.

Merity et al., "Pointer Sentinel Mixture Models", Available Online at—ARxIV:1609.07843V1, Sep. 26, 2016, 13 pages.

Papineni et al., "BLEU: A Method for Automatic Evaluation of Machine Translation", Proceedings of the 40th Annual Meeting on Association for Computational Linguistics, Available Online at: https://dl.acm.org/doi/pdf/10.3115/1073083.1073135, Jul. 2002, pp. 311-318.

Radford et al., "Improving Language Understanding by Generative Pre-training", Available Online at: https://s3-us-west-2.amazonaws.com/openai-assets/research-covers/language-unsupervised/language_understanding_paper.pdf, 2018, 12 pages.

Radford et al., "Language Models Are Unsupervised Multitask Learners", Computer Science, Available Online at: 1https://github.com/codelucas/newspaper, 2018, 24 pages.

Rajpurkar et al., "SQuAD: 100,000+ Questions for Machine Comprehension of Text", Proceedings of the Conference on Empirical Methods in Natural Language Processing, Available online at: https://doi.org/10.18653/v1/D16-1264, Oct. 11, 2016, pp. 2383-2392.

Rao et al., "Dear Sir or Madam, May I Introduce the GYAFC Dataset: Corpus, Benchmarks and Metrics for Formality Style Transfer", Proceedings of the 2018 Conference of the North American Chapter of the Association for Computational Linguistics: Human Language Technologies, vol. 1 (Long Papers), Jun. 2018, pp. 129-140.

(56) References Cited

OTHER PUBLICATIONS

Sancheti et al., "Reinforced Rewards Framework for Text Style Transfer", Advances in Information Retrieval, Apr. 2020, pp. 545-560.
Sennrich et al., "Neural Machine Translation of Rare Words with Subword Units", Proceedings of the 54th Annual Meeting of the Association for Computational Linguistics (vol. 1: Long Papers), Aug. 7-12, 2016, pp. 1715-1725.
Shen et al., "Style Transfer from Nonparallel Text by Cross-alignment", NIPS'17: Proceedings of the 31st International Conference on Neural Information Processing Systems, Dec. 2017, pp. 6833-6844.
Subramanian et al., "Multiple-attribute Text Style Transfer", Conference paper at ICLR 2019, Available Online at: https://openreview.net/pdf?id=H1g2NhC5KQ, 2019, pp. 1-20.
Sun et al., "ERNIE 2.0: A Continual Pre-training Framework for Language Understanding", The Thirty-Fourth AAAI Conference on Artificial Intelligence (AAAI-20), 2019, pp. 8968-8975.
Syed et al., "Adapting Language Models for Non-Parallel Author-Stylized Rewriting", arXiv:1909.09962, Available Online at: https://arxiv.org/abs/1909.09962, 2019, 8 pages.
Syed et al., "Stylistic Text Rewriting for a Target Author", arXiv:1909.09962, Available Online at https://arxiv.org/abs/1909.09962, 2019, 8 pages.
Tian et al., "Structured Content Preservation for Unsupervised Text Style Transfer", Computer Science, Computation and Language, Available online at: https://arxiv.org/pdf/1810.06526.pdf, 2018, pp. 1-13.
Vaswani et al., "Attention is All You Need", 31st Conference on Neural Information Processing Systems, Available Online at: https://arxiv.org/pdf/1706.03762.pdf, Dec. 6, 2017, pp. 1-15.
Wang et al., "GLUE: A Multi-task Benchmark and Analysis Platform for Natural Language Understanding", In Proceedings of the 2018 EMNLP Workshop BlackboxNLP: Analyzing and Interpreting Neural Networks for NLP, Nov. 2018, pp. 353-355.
Xu et al., "BERT Post-training for Review Reading Comprehension and Aspect-based Sentiment Analysis", Proceedings of the 2019 Conference of the North American Chapter of the Association for Computational Linguistics: Human Language Technologies, vol. 1 (Long and Short Papers), 2019, pp. 2324-2335.
Yang et al., "Unsupervised Text Style Transfer Using Language Models as Discriminators", Advances in Neural Information Processing Systems, 2019, pp. 7287-7298.

* cited by examiner

| Target style combination | Source sentence | Transferred Sentence | |
|---|---|---|---|
| | | Prior art | Proposed model (multi-style) |
| Positive+Formal | That's not funny. I don't think she'll like it. | So funny movie. I really like it. | That was very funny. I am sure she will appreciate it. |
| | Give your brother some money and tell him to take a hike. | Just give your brother some time and it will be good again. | Give your brother some money and request him to leave. |
| Negative+Formal | An intelligent, rewarding film that I look forward to watching again. | ludicrous, shallow film that look forward to watching again. | An unintelligent, poor film that I would not look forward to watching again. |
| | super friendly staff, quick service and amazing and simple food was done right! | says wait staff, quick not amazing before overcooked food done were okay. | dirty staff and slow service and simple food was not done right. |
| Positive+Informal | You need to separate the bad thing and move on. | need to the great thing and move on. | You need to enjoy the good stuff and move on. |
| | The evening started out slow. | The evening spent in professional show. | The evening began amazing. |
| Negative+Informal | Great food recommendations steak and tuna were both great. | terrible food 9am steak and were both terrible. | Disappointing food recommendations steak and tuna were horrible. |
| | That person in hilarious. | You person in worse! | That guy in so boring. |

MULTI-DIMENSIONAL LANGUAGE STYLE TRANSFER

CROSS-REFERENCE TO RELATED APPLICATIONS

This application is a continuation application of U.S. application Ser. No. 17/073,258, filed Oct. 16, 2020, now allowed, which is incorporated herein by reference in its entirety.

TECHNICAL FIELD

This disclosure relates generally to computer-implemented methods and systems for natural language processing. Specifically, the present disclosure involves transferring a style of a sentence into a multidimensional style that contains multiple target styles.

BACKGROUND

Repurposing text content into different styles is an important part of a copywriter's job. Many scenarios require re-writing the same content in different tones of language (referred to as a style here) to suit the needs of either end-users or the delivery channel. For example, a product launch announcement may be made in a casual style when shared with employees, but need to be in a more formal style when shared with the board of directors or general users. Authoring methods can assist transfer between such styles while trying to keep the underlying content intact, without re-writing by the content creator or author.

However, existing authoring methods regenerate text on a single style dimension only (e.g., formality, sentiment, etc.). Text contents are often myriad combinations of multiple related styles and personalization of content thus requires optimizing across several styles. For example, changing excitement in a text can impact the formality of the text, which might be undesirable. As a result, the existing authoring tools are unable to simultaneously transfer an input text into multiple style dimensions.

SUMMARY

Certain embodiments involve multidimensional language style transfer. In one example, a system receives, from a computing device, an input text and a request to transfer the input text to a target style combination including a set of target styles. The system applies a style transfer language model associated with the target style combination to the input text to generate a transferred text in the target style combination. The style transfer language model comprises a cascaded language model configured to generate the transferred text. The cascaded language model is trained using a set of discriminator models corresponding to the set of target styles. The system provides, to the computing device, the transferred text.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

The present disclosure involves multidimensional language style transfer. As discussed above, existing style transfer methods often generate unsatisfactory results when transferring an input text to a multidimensional style or a style combination containing multiple target styles. Certain embodiments described herein address these limitations by introducing language models trained for respective target styles as discriminator models in the style transfer language model. For instance, a model training subsystem generates and trains a discriminator model for each target style using a corresponding training dataset labeled for the target style. The model training subsystem further generates a multidimensional style transfer language model (or "style transfer language model" in short) for a particular target style combination by including a cascaded language model and multiple discriminator models. These multiple discriminator models correspond to the multiple target styles contained in the particular target style combination. A style transfer subsystem uses the trained style transfer language model to transfer a source sentence into a sentence in the particular target style combination. For instance, for a source sentence "That person is hilarious" and a target style combination of "negative" sentiment and "informal," the transferred sentence could be "That guy is so boring."

The following non-limiting example is provided to introduce certain embodiments. In this example, a style transfer computing system generates a pre-trained language model using a large unlabeled corpus of text. The pre-trained language model is configured to accept a masked or noisy input sentence as the input and output a complete sentence for the noisy input. As a result, the pre-trained language model understands the general language and can thus be utilized to initialize the models used for style transfer. The style transfer computing system further generates a set of discriminator models for a set of styles containing target styles that may be included in a target style combination. For each style in the set of styles, the style transfer computing system generates one discriminator model using a training dataset labeled for at least that style. According to certain aspects, the discriminator model for a style includes an encoder and a decoder each initialized using the pre-trained language model and trained using the training set labeled for the style. The trained discriminator is configured to convert an input sentence to a sentence in the corresponding style.

To obtain a style transfer language model for a given target style combination containing multiple target styles, the style transfer computing system constructs a cascaded language model including an encoder and a decoder. To speed up the training of the cascaded language model, each of the encoder and the decoder is initialized with the pre-trained language model. The style transfer computing system further utilizes a corresponding discriminator model for each target style contained in the target style combination. As a result, the style transfer language model includes the cascaded language model and multiple discriminator models for the multiple target styles in the target style combination. The training of the style transfer language model thus involves minimizing a loss function that includes a loss term for the cascaded language model and multiple loss terms for the multiple discriminator models. For a different target style combination, the style transfer computing system constructs a corresponding style transfer language model in a similar way.

Utilizing the style transfer language model, the style transfer computing system or another computing system, can convert an input source sentence to a sentence in the target style combination. For example, the style transfer computing system receives a request to transfer a source sentence into a target sentence in a target style combination. The style transfer computing system accesses a trained style transfer language model corresponding to the target style combination. The style transfer computing system further applies the cascaded language model in the style transfer language model to the source sentence to generate the output sentence in the target style combination.

As described herein, certain embodiments provide improvements in language style transfer by using multiple discriminators in training a style transfer language model to enable transferring the style of a sentence into a target style combination. This allows the transfer of a sentence to multiple styles to be performed simultaneously and with higher accuracy. In addition, using multiple discriminators in the training eliminates the needs of using the training dataset labeled with all the target styles in the target style combination. Instead, separate training datasets independently labeled with respective target styles can be used, thereby significantly reducing the time and complexity of generating the training dataset and thus the overall training process.

As used herein, the term "style" or "text style" is used to refer to the tone of the text in terms of, for example, formality, sentiment, and excitement. The type of the styles such as the formality, sentiment and excitement is referred to as "style dimension." A style can be a value in a binary style dimension or a style dimension with multiple values. For example, in the formality style dimension, a style can be either "informal" or "formal." In the sentiment style dimension, the style can be "positive" or "negative." In the excitement style dimension, the style can be one of "excited," "neutral," and "unexcited," or other multiple levels of excitement.

As used herein, the term "target multidimensional style" or "target style combination" is used to refer to a combination of multiple target styles. For instance, a target multidimensional style or a target style combination can include a "formal" style in the formality style dimension and a "negative" sentiment style in the sentiment style dimension.

As used herein, the term "training dataset" is used to refer to a dataset of sentences each labeled for at least one style. For example, a training dataset may include a sentence "This is very helpful and I really appreciate it." and a label of "positive" (for the sentiment style dimension) and a label of "formal" (for the formality style dimension). Similarly, the term "training dataset labeled for a style dimension" is used to refer to a dataset of sentences each of which has a label for a style in that style dimension. For example, in a training dataset labeled for a formality style dimension, each sentence has at least a label of "formal" style or "informal" style.

As used herein, the term "token" is used to refer to a word in a text, such as a sentence. The term "mask token" is used to refer to a token or a word used to mask a token in the text. For example, a mask token can be denoted as "<mask>" and used to replace a word or token in a sentence to mask that token or word.

Example Operating Environment for Multidimensional Style Transfer

Figure 1:
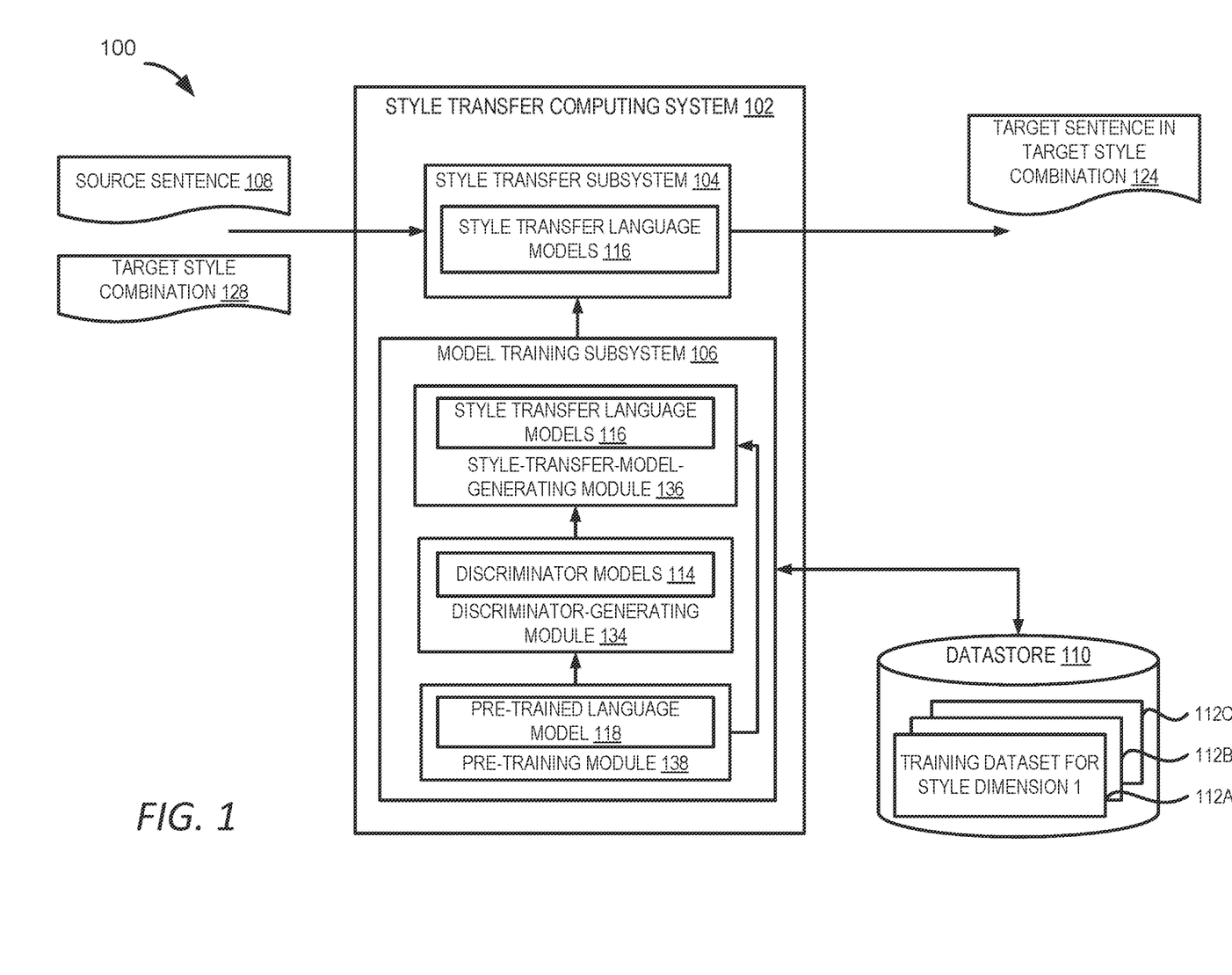
FIG. 1 depicts an example of a computing environment for using a style transfer language model to transfer a source sentence into a sentence in a multidimensional style containing multiple target styles, according to certain aspects of the present disclosure.

Referring now to the drawings, FIG. 1 depicts an example of a computing environment 100 for building style transfer language model 116 and using the style transfer language model 116 to transfer a source sentence 108 to a target sentence 124 in a target style combination 128. The computing environment 100 includes a style transfer computing system 102, which can include one or more processing devices that execute a style transfer subsystem 104 to perform style transfer for input sentences and a model training subsystem 106 for training the style transfer language models 116 used in the style transfer. The computing environment 100 further includes a datastore 110 for storing data used in the style transfer, such as the training datasets 112A-112C labeled for different style dimensions (which may be referred to herein individually as a training dataset 112 or collectively as the training datasets 112).

The style transfer subsystem 104 and the model training subsystem 106 may be implemented using software (e.g., code, instructions, program) executed by one or more processing units (e.g., processors, cores), hardware, or combinations thereof. The software may be stored on a non-transitory storage medium (e.g., on a memory device). The computing environment 100 depicted in FIG. 1 is merely an example and is not intended to unduly limit the scope of claimed embodiments. One of the ordinary skill in the art would recognize many possible variations, alternatives, and modifications. For example, in some implementations, the style transfer computing system 102 can be implemented using more or fewer systems or subsystems than those shown in FIG. 1, may combine two or more subsystems, or may have a different configuration or arrangement of the systems or subsystems.

The style transfer subsystem 104 is configured to receive a source sentence 108 in a source style. The source sentence 108 may be provided to the style transfer subsystem 104 by a user entering the sentence or by parsing the source sentence 108 from a document uploaded, transmitted, or otherwise provided to the style transfer computing system 102. The style transfer subsystem 104 is further configured to receive a target style combination 128 that identifies a combination of multiple target styles to which the source sentence 108 is to be transferred.

To transfer the source sentence 108 into the target style combination 128, the style transfer subsystem 104 employs a style transfer language model 116. The style transfer computing system 102 generates the style transfer language model 116 using the model training subsystem 106. The model training subsystem 106 builds and trains the style transfer language models 116 for different target style combinations 128. In FIG. 1, the model training subsystem 106 includes a pre-training module 138, a discriminator-generating module 134, and a style-transfer-model-generating module 136.

The pre-training module 138 is configured to generate a pre-trained language model 118 on a large unlabeled corpus of text to understand the general language. For example, the pre-training module 138 pre-trains a Transformer based language model with a masked language modeling (MLM) objective on the English encyclopedia text. This enables the language model to predict masked words in the input sentences.

The discriminator-generating module 134 is configured to generate a set of discriminator models 114 for a set of single-dimensional styles. More specifically, the discriminator-generating module 134 constructs and trains a discriminator model 114 for each style in the set of styles. In some examples, the set of styles include the possible target styles that may be contained in a target style combination. For a given style in the set of styles, the discriminator-generating module 134 constructs a discriminator model 114 by including an encoder and a decoder connected to each other. To speed up the training of the discriminator model 114, each of the encoder and decoder is initialized as the pre-trained language model 118. The discriminator-generating module 134 further fine-tunes the discriminator model 114 using the training data for this style.

In some examples, the training dataset 112 for a style dimension includes sentences that are labeled with a style in that style dimension. For instance, the training dataset for the formality style dimension includes the sentences that are either labelled with "formal" or "informal." The training dataset 112 for a particular style dimension can thus be divided into multiple groups or subsets each corresponding to one style in this particular style dimension. Continuing the above example, the training dataset for the formality style dimension can thus be divided into two groups or subsets. The first group contains the training sentences each labelled with "formal" and the second group contains the training sentences each labelled with "informal." Note that the sentences in each of the training datasets 112 may have labels for styles in other style dimension. As such, the training datasets 112 for different style dimensions may have overlapped sentences.

In order to train a discriminator model 114 for a certain style, the discriminator-generating module 134 identifies the training dataset 112 for the associated style dimension of the style and retrieves the group or subset corresponding to the style. For instance, to train a discriminator model 114 for a "formal" style, the discriminator generating module 134 identifies that the training dataset 112 for the formality style dimension should be used. The discriminator generating module 134 further retrieves the group or subset of the training dataset 112 that are labelled as "formal." The discriminator generating module 134 further uses the retrieved subset of the training dataset to train the discriminator model 114 for the "formal" style. The discriminator-generating module 134 repeats the above process for each style in the set of styles and thus generates a set of discriminator models 114 having the same number of styles in the set of styles.

The style-transfer-model-generating module 136 is configured to generate a style transfer language model 116 for each target style combination 128 that the style transfer computing system 102 is configured to transfer a sentence to. In some examples, a style transfer language model 116 includes a cascaded language model containing an encoder and a decoder connected to each other. The style-transfer-model-generating module 136 initializes the encoder and the decoder using the pre-trained language model 118 and trains the cascaded language model for style transfer. In order to enforce the style transfer to the target style combination 128, the style-transfer-model-generating module 136 further introduces discriminator models 114 into the style transfer language model 116. For each of the multiple target styles contained in the target style combination 128, the style-transfer-model-generating module 136 adds a corresponding discriminator model 114 into the style transfer language model 116. The corresponding discriminator model 114 of a style is the discriminator model 114 that is trained using the subset of training dataset 112 labeled for that style.

The style-transfer-model-generating module 136 trains the style transfer language model 116 by minimizing a loss function that includes a loss term for the cascaded language model and multiple loss terms for the multiple discriminator models. The style-transfer-model-generating module 136 repeats this process to construct and train style transfer language models 116 for different target style combinations 128. Additional details of generating the style transfer language model 116 are provided below with respect to FIGS. 2 and 3. In various examples, the pre-training module 138, the discriminator-generating module 134 or the style-transfer-model-generating module 136 can be implemented as one or more of program code, program code executed by processing hardware (e.g., a programmable logic array, a field-programmable gate array, etc.), firmware, or some combination thereof.

Among the generated style transfer language models 116, the style transfer subsystem 104 identifies the style transfer language model 116 for the received target style combination 128. The style transfer subsystem 104 further applies the style transfer language model 116 to the source sentence 108 to generate the target sentence 124 in the target style combination 128. Additional details about generating the target sentence 124 in the target style combination 128 are provided below with respect to FIGS. 4 and 5.

Examples of Computer-Implemented Operations for Multidimensional Style Transfer

Figure 2:
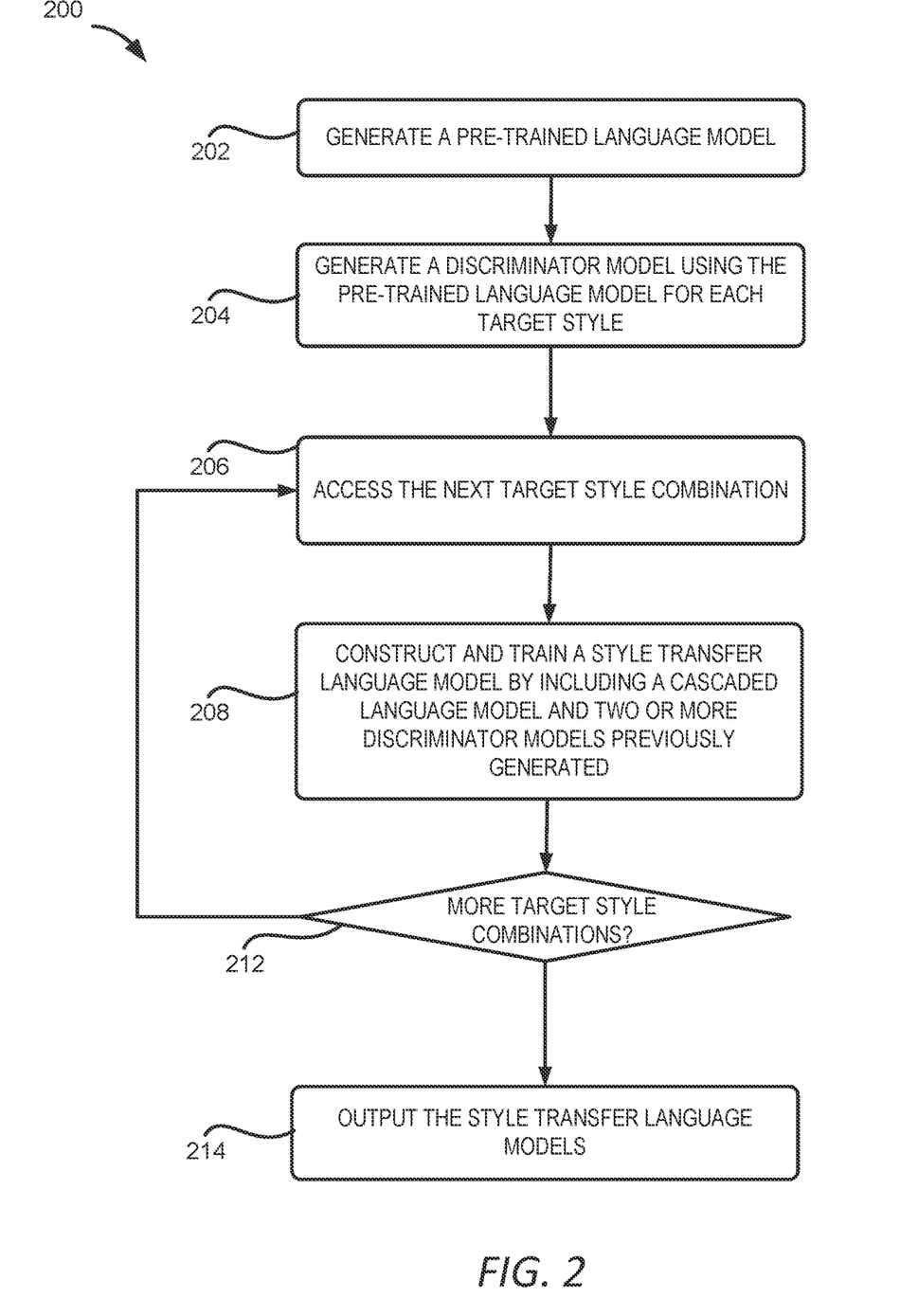
FIG. 2 depicts an example of a process for generating and training style transfer language models for different target multidimensional styles, according to certain aspects of the present disclosure.

FIG. 2 depicts an example of a process for generating and training style transfer language models for different target multidimensional styles or target style combinations, according to certain embodiments of the present disclosure. FIG. 2 is described in conjunction with FIG. 3 where an example of a block diagram of the modules used for multidimensional style transfer is depicted. One or more computing devices (e.g., the computing system 102 or the individual modules contained therein) implement operations depicted in FIG. 2. For illustrative purposes, the process 200 is described with reference to certain examples depicted in the figures. Other implementations, however, are possible.

Figure 3:
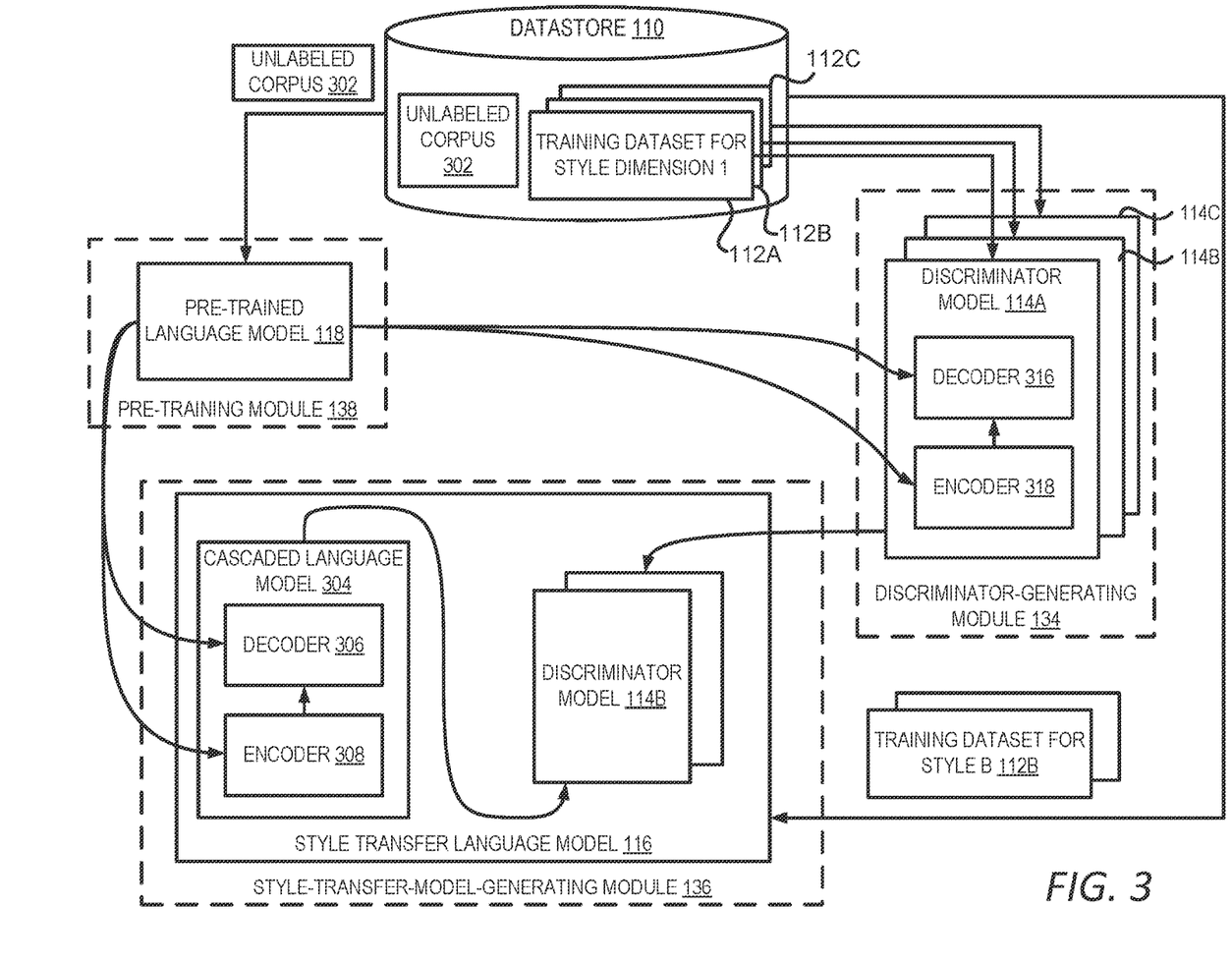
FIG. 3 depicts an example of a block diagram illustrating the relationship between the various modules and models used for generating the style transfer language model, according to certain aspects of the present disclosure.

At block 202, the process 200 involves generating a pre-trained language model 118 for understanding the general language. In some examples, the pre-trained language model 118 is generated using a Transformer based language model and trained on a large unlabeled corpus of text. The unlabeled corpus can be any corpus of text in a language for which the style transfer is to be performed. The corpus does not need labels associated with the sentences indicating their styles because at this stage the pre-trained language model 118 is mainly utilized to understand the general language rather than the styles. For instance, the unlabeled corpus can include English text data extracted from one or more websites or encyclopedia text. As shown in FIG. 3, the unlabeled corpus 302 can also be stored in the datastore 110 and the pre-training module 138 retrieves the unlabeled corpus 302 from the datastore 110 for generating the pre-trained language model 118.

In one example, the pre-training module 138 pre-trains the Transformer based language model with a masked language modeling (MLM) objective. This enables the pre-trained language model 118 to predict masked words in the input sentence. In this example, the pre-training module 138 randomly or pseudo-randomly samples a portion of the input tokens from the text stream of the corpus and replaces the sampled input words with a mask token, a random token, or the original token. In an example, the pre-training module 138 randomly or pseudo-randomly samples 15% of the input tokens. For the 15% of the input tokens, the pre-training module 138 replaces a token with a mask token 80% of the time, with a random token 10% of the time, and keep it unchanged 10% of the time. The objective of the pre-trained language model 118 is to predict the original identity of the masked or replaced word based on its bidirectional context. The trained pre-trained language model 118 is thus able to predict masked words in the input sentence to generate a complete sentence.

At block 204, the process 200 involves generating a discriminator model 114 for each single-dimensional target style $s_i \in S$, where S denotes a set of N single-dimensional target styles. A target style combination 128 thus contains multiple single-dimensional target styles from S. In some examples, the discriminator-generating module 134 generates the discriminator models 114 by fine-tuning the pre-trained language model 118. For example, as shown in FIG. 3, the discriminator-generating module 134 generates a discriminator model 114 for a style $s_i$ by including an encoder 316 and a decoder 318. To speed up the training process and to increase the accuracy of the discriminator model 114, the discriminator generating module 134 uses the pre-trained language model 118 generated by the pre-training module 138 to initialize the encoder 316 and the decoder 318 of the discriminator model 114.

The discriminator generating module 134 further fine-tunes the encoder-decoder model with a causal language modeling (CLM) objective on the subset of training dataset labelled for style $s_i$, $i=1, \ldots, N$, denoted as $T_i$. The CLM training loss for the discriminator model 114 for target style $s_i$ with the corresponding training sub-dataset $T_i$ is formulated as:

$$\mathcal{L}^{s_i} = \mathbb{E}_{x \sim T_i} \left[ \sum_{t=1}^{n} -\log P_{LM}(x_t | x_1, \ldots, x_{t-1}) \right] \qquad (1)$$

which is the loss over prediction probability of the next token $x_t$ at time t, given the previous tokens $x_1, \ldots, x_{t-1}$ from the sentence. Here, n the total number of tokens in the sentence. This training step transforms the language distribution of the discriminator model 114 to a single style $s_i$. FIG. 3 illustrates the discriminator models 114A-114C generated by the discriminator-generating module 134. In some cases, one or more operations described with respect to block 204 can be used to implement a step for generating a discriminator model 114 for each of the target styles based on the training datasets 112.

At block 206, the process 200 involves obtaining a target style combination 128, such as accessing the next target style combination 128 from a list of target style combinations 128 that the style transfer computing system 102 is configured to handle. Given the target style combination 128, at block 208, the style-transfer-model-generating module 136 constructs and trains a style transfer language model 116 for this particular target style combination 128. As shown in FIG. 3, the constructed style transfer language model 116 includes a cascaded language model 304 by cascading an encoder 308 with a decoder 306. In some examples, the encoder 308 and the decoder 306 are each initialized as the pre-trained language model 118 generated by the pre-training module 138.

If the pre-trained language model 118 is generated using the Transformer based language model, the encoder 308 and the decoder 306 can be connected by randomly or pseudo-randomly initialized attention layers. The architecture of Transformer based language models allows cascading two instances of the pre-trained language model 118, without explicitly aligning the encoder's output and decoder's input, by implicitly employing the in-built attention mechanism in the Transformer architecture. This can be achieved by initializing the encoder 308 and the decoder 306 with learned parameters of the pre-trained language model 118.

To instill style aware transfer ability to the cascaded language model 304, the style-transfer-model-generating module 136 fine-tunes the cascaded encoder and decoder with a denoising autoencoder (DAE) loss using a training dataset T for the cascaded language model 304. For the particular target style combination 128 for which the cascaded language model 304 is built, the training dataset T includes a combination of the subsets of the training datasets 112 for the target styles contained in the target style combination 128. These subsets of training datasets 112 are used to independently train the respective discriminator models 114 as described above with respect to block 204. For example, as shown in FIG. 3, if the target style combination 128 includes target styles B and C, the training dataset T for the cascaded language model 304 includes the subset of training dataset for style B and the subset of training dataset for style C.

In other examples, the training dataset for the cascaded language model 304 includes a randomized mixture of the subsets of training datasets 112 for the styles contained in the target style combination 128. The order of the training sentences in these subsets of training datasets 112 are randomized and this randomized sequence of training sentences are provided to the cascaded language model 304 for training.

Under the DAE objective, the encoder 308 takes as input noisy masked version of the original sentence x and tries to fill in the mask token as per the MLM objective that it was pre-trained on. The decoder 306 attempts to re-create the stylistic version of the original sentence from this noisy output of the encoder. 308 The overall training objective of the cascaded language model 304 can be formulated as:

$$\mathcal{L}_{DAE}(\theta) = \mathbb{E}_{x \sim T}[-\log P_\theta(x|\tilde{x})] \qquad (2)$$

Here, θ are the trainable parameters of the joint encoder-decoder model of the cascaded language model 304. The noisy version $\tilde{x}$ of sentence x from the training dataset T is obtained after randomly or pseudo-randomly dropping tokens from x with probability $p_{drop}$ and randomly or pseudo-randomly masking the tokens in x with a probability of $p_{mask}$. In conjunction, the encoder 308 and decoder 306 learn to reconstruct the input sentence x by filling in appropriate words according to the target style combination 128. Note that the cascaded language model 304 does not use the source style of the input sentence x and is trained to generate sentences to match the styles of the training dataset T.

To further increase the accuracy of the style transfer of the cascaded language model 304, the style-transfer-model-generating module 136 includes discriminator models in the style transfer language model 116 to take the output of the cascaded language model 304 as input and provide feedback to the cascaded language model 304 for differentiating between the target style dimensions. Compared with a classifier-based discriminator, a language model based discriminator takes into account the language distribution of the target style. In addition, the language model based discriminators use only the target style training datasets for training the transfer model, whereas the classifier would require both source and target style corpus to distinguish between a sentence as being from one style or another. In some examples, the style-transfer-model-generating module 136 uses the discriminator models 114 generated and trained by the discriminator generating module 134 based on the pre-trained language model 118. The discriminator models 114 to be included in the style transfer language model 116 depend on the styles in the target style combination 128. In the example FIG. 3, the target style combination 128 includes styles B and C, and thus the discriminator models 114 included in the style transfer language model 116 contain the discriminator model 114 for style B and the discriminator models 114 for style C.

For a target style combination 128 containing k target styles, $s=\{s_1, s_2, \ldots, s_k\}$, training of its corresponding style transfer language model 116 is thus performed by minimizing an overall loss function defined over the cascaded language model 304 and the discriminator models 114. If the cascaded language model 304 is fine-tuned using the DAE loss and the discriminator models 114 are fine-tuned using the CLM loss, the overall loss function of the style transfer language model 116 becomes:

$$\mathcal{L} = \lambda_{DAE} \mathbb{E}_{x \sim T}[-\log P_\theta(x | \tilde{x})] + \qquad (3)$$

$$\sum_{i=1}^{k} \lambda_i \mathbb{E}_{x \sim T, x' \sim P_\theta(x)} \left[ \sum_{t=1}^{n_x} -\log P_{LM_i}(x'_t | x'_1, \ldots, x'_{t-1}) \right]$$

where $\lambda_{DAE}$ and $\{\lambda_i\}_{i=1}^{k}$ are hyper-parameters. $\lambda_{DAE}$ is the weight coefficient of the DAE loss $\mathbb{E}_{x \sim T}[-\log P_\theta(x|\tilde{x})]$, and $\lambda_i$ is the weight coefficient for discriminator loss $$\mathbb{E}_{x \sim T, x' \sim P_\theta(x)} \left[ \sum_{t=1}^{n_x} -\log P_{LM_i}(x'_t | x'_1, \ldots, x'_{t-1}) \right]$$

corresponding to style $s_i$, where $n_x$ is the number of tokens in the sentence x, and x' is the transferred version of sentence x generated by the cascaded language model 304. The overall loss is the weighted sum of the DAE loss and the discriminative losses. The DAE loss attempts to reconstruct the input from its noisy version because the input x is from one of the target styles. At the same time, the discriminative losses attempt to ensure that the transferred output is aligned with the other styles as well for which x has no information. In conjunction, these losses lead the transfer towards the target style combination $s=\{s_1, s_2, \ldots, s_k\}$.

From the above, it can be seen that the loss term is calculated for the transferred sentence x' using the discriminator model 114 for each target style. In this way, the adversarial training for the discriminator can be eliminated, since the fine-tuned discriminator model 114 is implicitly capable of assigning high values to negative samples (out-of-style samples).

Although the above describes the random masking for generating noisy sentence input to the cascaded language model 304, in additional examples, attribute masking is employed. In attribute masking, instead of randomly choosing words for masking, attribute-specific (or style-specific) words are identified from the input sentence and replaced with a [MASK] token. To identify these attribute (or style-specific) words, input tokens with high salience (e.g., relative frequency) in a source corpus containing the input text are tagged as attribute markers. The intuition behind this is that the words that are more frequent in the source style corpus than the target style corpus reflect the style specific information. Although the rest of the training process makes use of the target corpus alone, identifying the attribute-specific words makes use of the source corpus as well for comparing the relative frequency of each token. For a target style combination, the attribute words are identified from the mixture of subsets of training datasets from each of the target styles and their respective source styles. With such masking, the model understands and learns the nuances of attribute vocabulary faster and perform the style transfer better.

In some cases, one or more operations described with respect to block 208 can be used to implement a step for training, based on the set of training dataset 112 and the discriminator models for the set of target styles, a style transfer language model 116 for a target style combination that comprises two or more target styles.

At block 210, the process 200 involves determining whether there are more target style combinations. If so, the process 200 involves accessing the next target style combination at block 206 and constructing and training a style transfer language model 116 for such a target style combination 128 at block 208. If there are no more target style combinations for model construction, the process 200 involves outputting the style transfer language models 116 at block 212.

The operations described above with respect to FIG. 2 and the models and modules shown in FIG. 3 are for illustration purposes only and should not be construed as limiting. Fewer or more blocks can be included in the process 200 of FIG. 2. Likewise, fewer or more modules or models can be included in the block diagram shown in FIG. 3. For example, the discriminator models 114 and the cascaded language model 304 can be built and trained without using the pre-trained language model 118. As such, block 202 for generating the pre-trained language model 118 can be eliminated from FIG. 2, and the pre-training module 138 and the pre-trained language model 118 can be removed from FIG. 3. Other blocks, modules or models can be added or removed from FIGS. 2 and 3 depending on the way the style transfer language model 116 is constructed.

Figure 4:
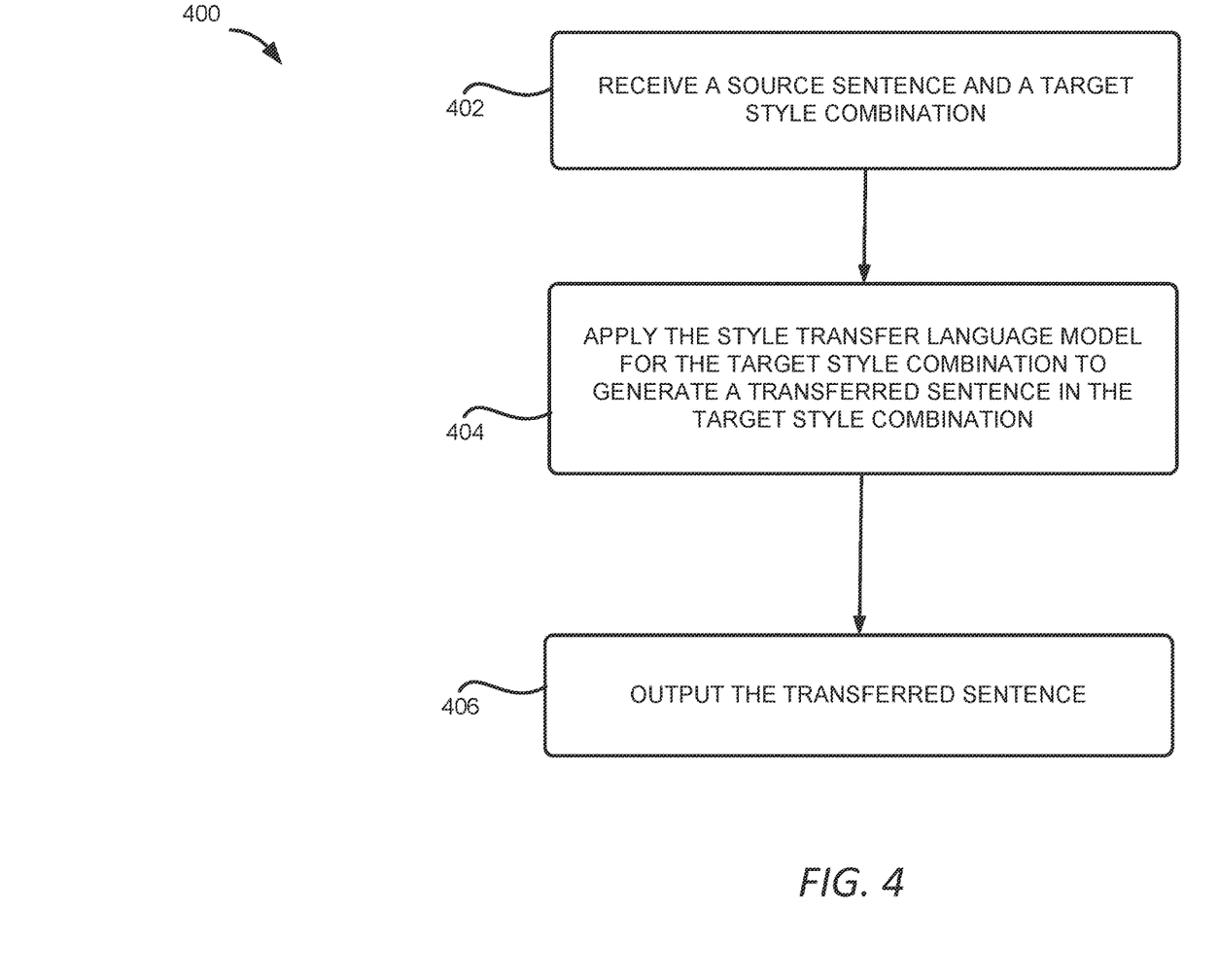
FIG. 4 depicts an example of a process for using a style transfer language model to transfer the style of a source sentence into a sentence in a target multidimensional style, according to certain aspects of the present disclosure.

FIG. 4 depicts an example of a process 400 for using a style transfer language model 116 to transfer a source sentence 108 to a target sentence 124 in a target style combination 128, according to certain embodiments of the present disclosure. It should be noted that in the example of the process 400 shown in FIG. 4, the model style transfer language model 116 used for style transfer has already been trained as discussed above with respect to FIGS. 2 and 3. One or more computing devices (e.g., the style transfer computing system 102) implement operations depicted in FIG. 4 by executing suitable components (e.g., the style transfer subsystem 104). For illustrative purposes, the process 400 is described with reference to certain examples depicted in the figures. Other implementations, however, are possible.

At block 402, the process 400 involves the style transfer subsystem 104 receiving a source sentence 108 and a target style combination 128. The target style combination 128 specifies two or more target styles that the source sentence 108 is to be transferred into. At block 404, the process 400 involves the style transfer subsystem 104 accessing the style transfer language model 116 that is designed for the target style combination 128 and applying the style transfer language model 116 to the source sentence 108. The style transfer subsystem 104 retrieves the style transfer language model 116, for example, from a datastore configured for storing the available style transfer language models 116. The style transfer subsystem 104 provides the source sentence 108 as an input to the style transfer language model 116 and obtains the output of the style transfer language model 116 as the target sentence 124. In examples, the cascaded language model 304 of the style transfer language model 116 is used to generate the target sentence 124 without using the discriminator models 114. In other words, the discriminator models 114 that are used for training the cascaded language model 304 are no longer used when generating the target sentence 124. At block 406, the style transfer subsystem 104 outputs the target sentence 124, for example, by displaying the target sentence 124 on a display device, writing the target sentence 124 to a file in a storage device, or sending the target sentence 124 to a remote computing device over a network.

Figure 5:
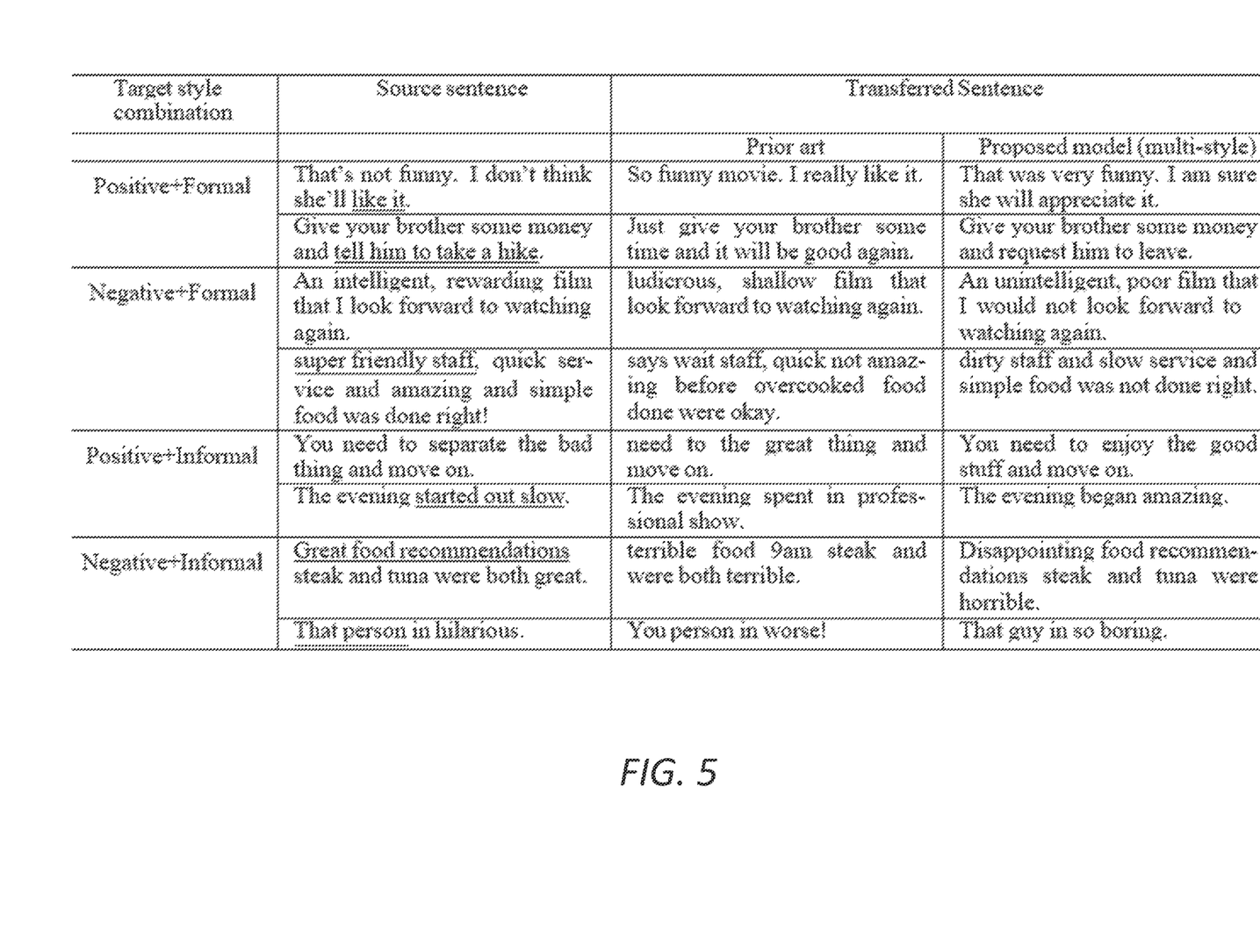
FIG. 5 depicts examples of source sentences and transferred sentences using the style transfer language models, according to certain aspects of the present disclosure.

FIG. 5 depicts examples of source sentences and transferred sentences using the style transfer language model 116, according to certain aspects of the present disclosure. In the example shown in FIG. 5, four target style combinations 128 are shown: positive and formal, negative and formal, positive and informal, negative and informal. FIG. 5 also shows the transferred sentences generated by a prior art using a two-stage style transfer approach by transferring a sentence to a first style and then to a second style.

The results shown in FIG. 5 are generated with the following settings. For the pre-trained language model 118, a 12-layer Transformer model with 512 hidden units, 16 heads, a dropout rate of 0.1 are used. The models are trained with the Adam optimizer, and a learning rate of $10^{-4}$. To speed up the training process, the pre-trained language model 118 is separately fine-tuned before initializing the encoder-decoder setup in the discriminator models 114 and the cascaded language model 304. For each of the discriminator models 114, the discriminator-generating-module 134 or another module in the model training subsystem 106 uses the subset of training dataset for the style corresponding to the discriminator model to fine-tune the pre-trained language model with the causal language modeling (CLM) objective. This fine-tuned pre-trained language model is used to initialize the decoder of the corresponding discriminator model 114. The encoder of the discriminator model 114 is still initialized using the pre-trained language model 118. The discriminator-generating module 134 then trains the encoder-decoder framework of the discriminator model 114 as discussed above (e.g., the discussion with regard to block 204 of FIG. 2).

Similarly, for the cascaded language model 304, before starting the training of the encoder-decoder framework of the cascaded language model 304, the style-transfer-model-generating module 136, or another module in the model training subsystem 106, uses the subsets of training datasets for the styles in the target style combination to fine-tune the pre-trained language model 118. This fine-tuning process uses a combination of CLM loss and discriminator loss to handle partially annotated dataset for the target style combination as follows:

$$\mathcal{L} = \lambda_{CLM} \mathbb{E}_{x \sim T}\left[\sum_{t=1}^{n} -\log P_{LM}(x_t \mid x_1, \ldots, x_{t-1})\right] + \sum_{i=1}^{k} \lambda_i \mathbb{E}_{x \sim T, x' \sim P_\theta(x)}\left[\sum_{t=1}^{n_x} -\log P_{LM_i}(x'_t \mid x'_1, \ldots, x'_{t-1})\right] \quad (4)$$

where, $\lambda_{CLM}$ is the weight coefficient of the CLM loss and other parameters are similar to those in Eqn. (3). This fine-tuned model is used to initialize the encoder of the cascaded language model 304. The encoder of the cascaded language model 304 is still initialized using the pre-trained language model 118. The style-transfer-model-generating module 136 then trains the encoder-decoder framework of the cascaded language model 304 as discussed above (e.g., the discussion with regard to block 208 of FIG. 2).

As shown in FIG. 5, the prior art model does not perform as well on the content preservation as the style transfer language model 116 disclosed herein. This is because transferring style one after another leads to large content loss. In contrast, the style transfer language model 116 presented here maintains good content preservation and conforms well to the target style combination.

Although the above description focuses on English language style transfer, the multidimensional style transfer presented herein applies to any language as long as the training datasets and text corpus are in the proper language. Further, while a sentence is described above as the input to the style transfer language model 116, two or more sentences can be used as the input to the style transfer language model 116 for style transfer. As a result, the target sentence 124 may also contain two or more sentences.

Computing System Example for Implementing Multidimensional Style Transfer

Figure 6:
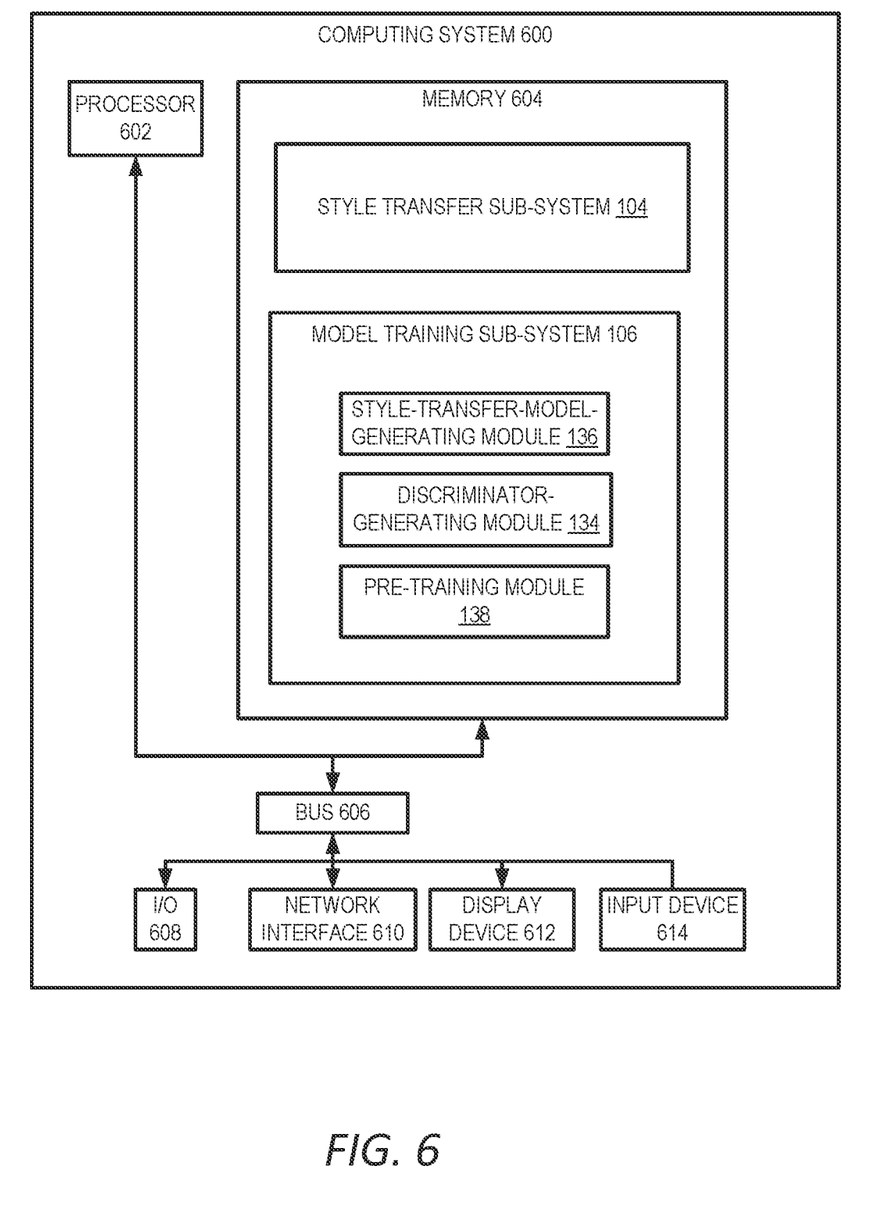
FIG. 6 depicts an example of a computing system that executes an image manipulation application for performing certain aspects of the present disclosure.

Any suitable computing system or group of computing systems can be used for performing the operations described herein. For example, FIG. 6 depicts an example of a computing system 600 that can implement the computing environment of FIG. 1. In some embodiments, the computing system 600 includes a processing device 602 that executes the style transfer subsystem 104, a model training subsystem 106, or a combination of both, a memory that stores various data computed or used by the style transfer subsystem 104 or the model training subsystem 106, an input device 614 (e.g., a mouse, a stylus, a touchpad, a touchscreen, etc.), and a display device 612 that displays content generated by the style transfer subsystem 104. For illustrative purposes, FIG. 6 depicts a single computing system on which the style transfer subsystem 104 or the model training subsystem 106 is executed, and the input device 614 and display device 612 are present. But these applications, datasets, and devices can be stored or included across different computing systems having devices similar to the devices depicted in FIG. 6.

The depicted example of a computing system 600 includes a processing device 602 communicatively coupled to one or more memory devices 604. The processing device 602 executes computer-executable program code stored in a memory device 604, accesses information stored in the memory device 604, or both. Examples of the processing device 602 include a microprocessor, an application-specific integrated circuit ("ASIC"), a field-programmable gate array ("FPGA"), or any other suitable processing device. The processing device 602 can include any number of processing devices, including a single processing device.

The memory device 604 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 600 may also include a number of external or internal devices, such as an input device 614, a display device 612, or other input or output devices. For example, the computing system 600 is shown with one or more input/output ("I/O") interfaces 608. An I/O interface 608 can receive input from input devices or provide output to output devices. One or more buses 606 are also included in the computing system 600. The buses 606 communicatively couples one or more components of a respective one of the computing system 600.

The computing system 600 executes program code that configures the processing device 602 to perform one or more of the operations described herein. The program code includes, for example, the style transfer subsystem 104, the model training subsystem 106 or other suitable applications that perform one or more operations described herein. The program code may be resident in the memory device 604 or any suitable computer-readable medium and may be executed by the processing device 602 or any other suitable processor. In some embodiments, all modules in the model training subsystem 106 (e.g., the style-transfer-model-generating module 136, the discriminator generating module 134, the pre-training module 138, etc.) are stored in the memory device 604, as depicted in FIG. 6. In additional or alternative embodiments, one or more of these modules from the model training subsystem 106 are stored in different memory devices of different computing systems.

In some embodiments, the computing system 600 also includes a network interface device 610. The network interface device 610 includes any device or group of devices suitable for establishing a wired or wireless data connection to one or more data networks. Non-limiting examples of the network interface device 610 include an Ethernet network adapter, a modem, and/or the like. The computing system 600 is able to communicate with one or more other computing devices (e.g., a computing device that receives inputs for the style transfer subsystem 104 or displays outputs of the style transfer subsystem 104) via a data network using the network interface device 610.

An input device 614 can include any device or group of devices suitable for receiving visual, auditory, or other suitable input that controls or affects the operations of the processing device 602. Non-limiting examples of the input device 614 include a touchscreen, stylus, a mouse, a keyboard, a microphone, a separate mobile computing device, etc. A display device 612 can include any device or group of devices suitable for providing visual, auditory, or other suitable sensory output. Non-limiting examples of the display device 612 include a touchscreen, a monitor, a separate mobile computing device, etc.

Although FIG. 6 depicts the input device 614 and the display device 612 as being local to the computing device that executes the style transfer subsystem 104, other implementations are possible. For instance, in some embodiments, one or more of the input device 614 and the display device 612 can include a remote client-computing device that communicates with the computing system 600 via the network interface device 610 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other types of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method performed by one or more computing devices, comprising:
   receiving, from a computing device, an input text and a request to transfer the input text to a target style combination including a set of target styles;
   applying a style transfer language model associated with the target style combination to the input text to generate a transferred text in the target style combination, wherein the style transfer language model comprises a cascaded language model configured to generate the transferred text, and wherein the cascaded language model is trained using a set of discriminator models corresponding to the set of target styles; and
   providing, to the computing device, the transferred text.

2. The method of claim 1, wherein the cascaded language model includes an encoder and a decoder, each of the encoder and the decoder initialized using a pre-trained language model.

3. The method of claim 1, wherein the input text includes an input sentence and wherein the transferred text includes a transferred input sentence.

4. The method of claim 1, wherein the computing device displays the transferred text.

5. The method of claim 1, further comprising training the cascaded language model, wherein training the cascaded language model comprises:
   generating the set of discriminator models corresponding to a set of styles based on a set of training datasets; and
   generating the style transfer language model comprising the cascaded language model and the set of discriminator models; and
   training the style transfer language model based on the set of training datasets.

6. The method of claim 5, wherein training the cascaded language model further comprises generating a pre-trained language model, wherein the set of discriminator models corresponding to the set of styles are generated based on the pre-trained language model, and the cascaded language model is generated based on the pre-trained language model.

7. The method of claim 1, wherein each discriminator model in the set of discriminator models corresponds to a style in the set of styles, and wherein generating the set of discriminator models comprising training each discriminator model using a corresponding subset of training dataset in the set of training datasets that is labeled for at least the style.

8. The method of claim 7, wherein each discriminator model in the set of discriminator models includes an encoder and a decoder, wherein each respective encoder and each respective decoder is initialized using the cascaded language model and is fine-tuned through training using the corresponding subset of training dataset.

9. A non-transitory computer-readable medium having program code that is stored thereon, the program code executable by one or more processing devices for performing operations comprising:
   receiving, from a computing device, an input text and a request to transfer the input text to a target style combination including a set of target styles;
   applying a style transfer language model associated with the target style combination to the input text to generate a transferred text in the target style combination, wherein the style transfer language model comprises a cascaded language model configured to generate the transferred text, and wherein the cascaded language model is trained using a set of discriminator models corresponding to the set of target styles; and
   providing, to the computing device, the transferred text.

10. The non-transitory computer-readable medium of claim 9, wherein the cascaded language model includes an encoder and a decoder, each of the encoder and the decoder initialized using a pre-trained language model.

11. The non-transitory computer-readable medium of claim 9, wherein the input text includes an input sentence and wherein the transferred text includes a transferred input sentence.

12. The non-transitory computer-readable medium of claim 9, wherein the computing device displays the transferred text.

13. The non-transitory computer-readable medium of claim 9, the operations further comprising training the cascaded language model, wherein training the cascaded language model comprises:
   generating the set of discriminator models corresponding to a set of styles based on a set of training datasets; and
   generating the style transfer language model comprising the cascaded language model and the set of discriminator models; and
   training the style transfer language model based on the set of training datasets.

14. The non-transitory computer-readable medium of claim 13, wherein training the cascaded language model further comprises generating a pre-trained language model, wherein the set of discriminator models corresponding to the set of styles are generated based on the pre-trained language model, and the cascaded language model is generated based on the pre-trained language model.

15. The non-transitory computer-readable medium of claim 9, wherein each discriminator model in the set of discriminator models corresponds to a style in the set of styles, and wherein generating the set of discriminator models comprising training each discriminator model using a corresponding subset of training dataset in the set of training datasets that is labeled for at least the style.

16. The non-transitory computer-readable medium of claim 15, wherein each discriminator model in the set of discriminator models includes an encoder and a decoder, wherein each respective encoder and each respective decoder is initialized using the cascaded language model and is fine-tuned through training using the corresponding subset of training dataset.

17. A system, comprising:
   a processor; and
   a non-transitory computer-readable medium having program code that is stored thereon that, when executed by the processor, cause the system to perform operations comprising:
      receiving, from a computing device, an input text and a request to transfer the input text to a target style combination including a set of target styles;
      applying a style transfer language model associated with the target style combination to the input text to generate a transferred text in the target style combination, wherein the style transfer language model comprises a cascaded language model configured to generate the transferred text, and wherein the cascaded language model is trained using a set of discriminator models corresponding to the set of target styles; and
      providing, to the computing device, the transferred text.

18. The system of claim 17, wherein the input text includes an input sentence and wherein the transferred text includes a transferred input sentence.

19. The system of claim 17, the operations further comprising training the cascaded language model, wherein training the cascaded language model comprises:
    generating the set of discriminator models corresponding to a set of styles based on a set of training datasets; and
    generating the style transfer language model comprising the cascaded language model and the set of discriminator models; and
    training the style transfer language model based on the set of training datasets.

20. The system of claim 19, wherein training the cascaded language model further comprises generating a pre-trained language model, wherein the set of discriminator models corresponding to the set of styles are generated based on the pre-trained language model, and the cascaded language model is generated based on the pre-trained language model.

\* \* \* \* \*